Patented Jan. 27, 1931

1,790,011

UNITED STATES PATENT OFFICE

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS

METHOD OF VULCANIZING RUBBER ARTICLES

No Drawing. Application filed July 22, 1926. Serial No. 124,293.

This invention relates to the vulcanization of rubber articles, particularly such as are vulcanized in open steam. The invention has particular reference to the vulcanization of rubber tubes suitable for use as inner tubes for pneumatic tire casings.

According to one method of manufacturing inner tubes they are built up upon mandrels and placed for vulcanization in a heater which is built with an atmosphere of steam under pressure. In this method of manufacture the outer surface of the tubes are exposed to the steam without the intervention of any covering material such as the spiral wrapping of tape used in certain other methods of tube manufacture. It is one object of this invention to improve the open cure of rubber tubes and other similar articles by increasing the molding effect of the heated atmosphere during the time prior to and during vulcanization. It is a further object of the invention to avoid danger due to the formation of air pockets or dead stages in the heater during the vulcanization period, whereby the degree of vulcanization given to various parts of the tube would differ.

My invention will now be described in its preferred form in relation to the manufacture of inner tubes of the laminated type. According to this method a piece of rubber stock of a width sufficient to extend a plurality of times around the forming mandrel is laid upon a table and rolled upon a straight pole or mandrel. In rolling a tube in this manner a longitudinal seam is left the whole length of that surface of the tube which is in contact with the mandrel. This seam must be smoothed out during the cure in order that the tube surface in contact with the mandrel may be perfectly smooth, it being the universal custom to invert the tube after vulcanization so that the originally inner surface ultimately becomes the surface exposed to the view of the purchaser. In some cases the ends of the tubes are bound to the mandrel by a suitable flexible sealing means while in other cases they may be held to the mandrel as by a film of cement.

Having prepared the tubes in this manner they are, according to my invention, placed in a vulcanizer. This vulcanizer can be similar to those already in use for the curing of inner tubes in open steam. The heater is sealed up as by the closing of the usual door, and air and steam, both under pressure, are admitted to the heater. When the total pressure in the heater has reached 50 pounds, which is preferably in about two and a half minutes, the air is turned off. This is conveniently done by an automatic valve which operates when the pressure in the heater becomes 50 pounds. A so-called "blow-down" valve is then opened, preferably also automatically, so that the atmosphere of steam and air in the heater is vented to the outside. The steam is left on during this entire period. As the steam pressure continues the total pressure in the heater will rise, preferably in about six minutes, to between 70 and 75 pounds, which is ten pounds more than the normal pressure at the end of the rise period, that is, the period in which the temperature is still rising. After the rise has been completed the steam pressure is adjusted so that this temperature will be maintained during the remainder of the cure, which may be about ten minutes.

By continuing the steam pressure while the blow-down valve is still open, turbulence of the combined air and steam in the heater is caused to take place which effectually mixes them and prevents the formation of air pockets. The use of air and steam in combination permits the use of a pressure greater than that which would result if steam at a temperature corresponding to that desired in the heater were used. Expressed in another way, the pressure in the heater is kept greater than the normal pressure for a similar cure in open steam alone. This is of considerable importance in some stocks, such as those which contain an accelerator operating at a relatively low temperature. Such stock will set rapidly at the low temperatures occurring at the first part of the cure, and this setting will prevent proper molding of the stock. By increasing the pressure in the heater before the temperature is increased, the molding of the tube while its rubber is still plastic is assured.

Having thus described my invention, I claim:

A method of vulcanizing rubber articles upon forms or mandrels with their outer surfaces exposed to the vulcanizing fluid, which comprises placing the articles, while on the forms, in a heating vessel; admitting to the heater air and steam simultaneously and under pressure until the combined pressure has increased sufficiently to mold the articles against the forms; shutting off the supply of air to the vessel while continuing the supply of steam; opening a vent in the vessel to permit a slight discharge of the mixture of fluids therein, thereby creating turbulence within the vessel and maintaining a homogeneous mixture therein; continuing the supply of steam to the vessel until the temperature has reached the desired curing temperature; and thereafter regulating the amount of steam admitted to maintain a constant curing temperature, the total pressure exerted by the fluids within the vessel being greater than that due to the steam alone.

MELVON A. MARQUETTE.